Oct. 31, 1967 H. E. DAVIS 3,350,251
METHOD AND APPARATUS FOR PRODUCING PLASTIC TUBING
Filed July 30, 1962 2 Sheets-Sheet 1
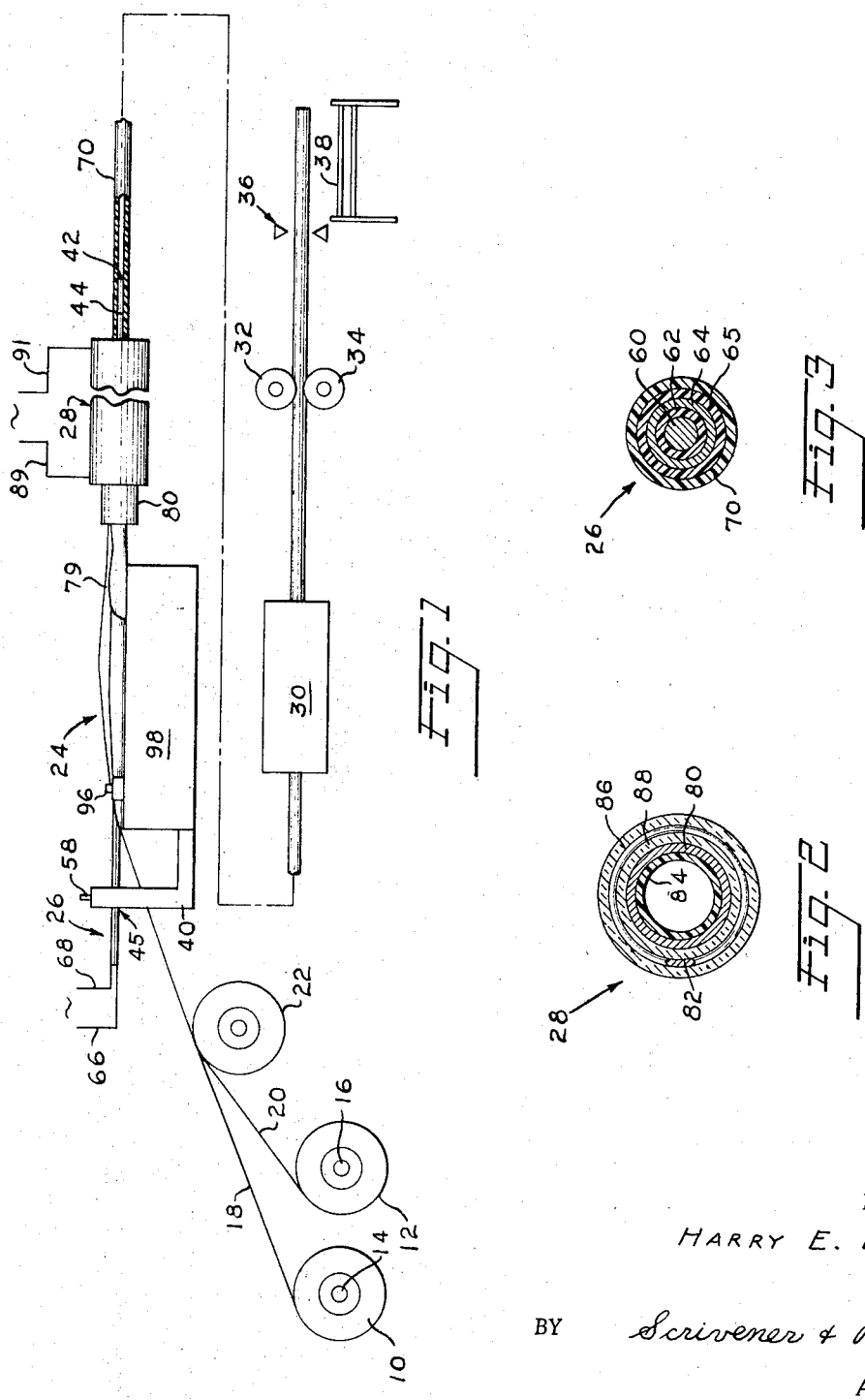
INVENTOR
HARRY E. DAVIS
BY *Scrivener & Parker*
ATTORNEYS Oct. 31, 1967  H. E. DAVIS  3,350,251
METHOD AND APPARATUS FOR PRODUCING PLASTIC TUBING
Filed July 30, 1962  2 Sheets-Sheet 2
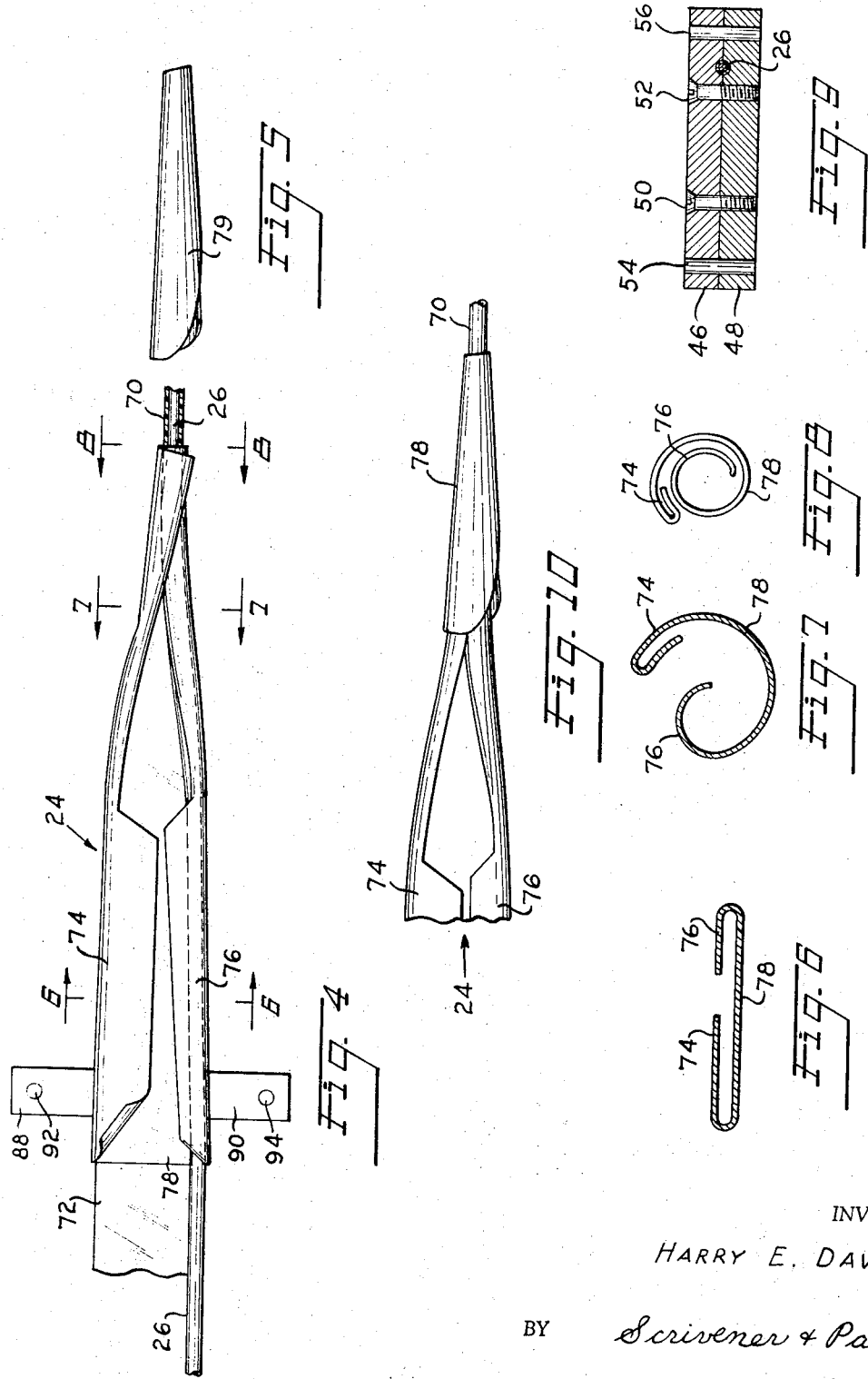
INVENTOR
HARRY E. DAVIS
BY Scrivener & Parker
ATTORNEYS United States Patent Office 3,350,251
Patented Oct. 31, 1967

3,350,251
METHOD AND APPARATUS FOR PRODUCING PLASTIC TUBING
Harry E. Davis, 510 E. Cuyahoga Falls Ave., Akron, Ohio 44310
Filed July 30, 1962, Ser. No. 213,515
6 Claims. (Cl. 156—218)

This invention relates to a method and apparatus for producing plastic tubing and more particularly to an arrangement for forming relatively rigid but hollow tubing which may be cut off in convenient lengths for use as beverage stirrers and sippers.

Various types of beverage stirrers and sippers have heretofore been proposed and in the case of stirrers formed of plastic material, these have been usually formed by an extrusion process. Such articles however, are easily cracked or fractured when in use and are hence not entirely satisfactory. Stirrers made of regenerated cellulose material such as cellophane have also been proposed but these too have not proved satisfactory and reliable due to the fact that they are insufficiently rigid to function as stirrers and the plies of material separate when in use.

It is accordingly one of the principal objects of the present invention to provide a novel method and apparatus for producing hollow tubing of cellophane which may be cut into lengths for use as beverage stirrers and sippers, the resulting product being of such a nature as to avoid the foregoing difficulties.

Another object is to provide a novel stirrer and sipper of cellophane which is of sufficient strength and rigidity as to function efficiently as a beverage stirring and sipping tube and wherein the plies of the cellophane are completely and firmly adhered together thus avoiding any possibility of the layers or plies from separating from each other.

A further object of the invention is to provide a novel continuous method for forming cellophane tubing of the above character wherein a plurality of superposed plies of flat cellophane are formed into a tube which is thereafter heated internally and externally in a novel manner to adhesively secure each of the plies together, the tubing being thereafter cooled and cut into convenient lengths for use.

A still further object comprehends the provision of a novel method and apparatus for forming cellophane tubing of the above character wherein the superposed plies of the flat material are continuously drawn under slight tension from the supply sources and are guided into tubular form around an elongated internally heated arbor, a substantial portion of the length of the latter and the cellophane tubing extending through an elongated heater whereby the cellophane plies forming the tubing are simultaneously heated internally and externally to effectively adhesively secure all of the plies to each other and together.

A further object is to provide in an apparatus of the foregoing type, a novel guide construction which insures that the multiple plies of the flat material are smoothly and efficiently overlapped to provide the tubular structure which is heated internally and externally as above set forth.

Other objects and novel features of the invention will appear more fully hereinafter from a consideration of the following detailed description when taken in connection with the accompanying drawing which is illustrative of the invention. It will be expressly understood however, that the drawing is utilized for purposes of illustration only and is not to be taken as a definition of the limits of the invention, reference being had for this latter purpose to the appended claims.

In the drawings wherein similar reference characters refer to similar parts throughout the several views;

FIG. 1 is a side view partly in section of an apparatus which may be employed in practicing the improved method of manufacturing cellophane tubing in accordance with the present invention;

FIG. 2 is a cross sectional view of the external heater used in FIG. 1;

FIG. 3 is an enlarged cross sectional view of the internal heating arbor used in FIG. 1;

FIG. 4 is a top view partly in section of the tube forming guide and illustrating the relationship between the guide, cellophane plies and the internal heating arbor;

FIG. 5 is a top view of the guide tip which is associated with the exit end of the guide;

FIGS. 6, 7 and 8 are cross sectional views of the guide taken substantially along the lines 6—6, 7—7, and 8—8 of FIG. 4;

FIG. 9 is a cross sectional view of the clamp which is employed for the internal heated arbor, and FIG. 10 is a fragmentary top view of the guide with the conical tip fixed to the exit end thereof.

Referring more particularly to FIG. 1, an apparatus for practicing the novel method of the present invention is illustrated therein as including a plurality of supply reels 10 and 12 of cellophane strip material which are suitably mounted for rotation on spindles 14 and 16, the cellophane strips or plies 18 and 20 from the reels being superposed and passing over a stationary tension reel 22 to a guide 24. The latter functions to form the plies 18 and 20 into tubular shape around a heated internal arbor or mandrel 26 the internally heated tubular material being continuously drawn under slight tension through an external heater 28 and a cooling zone 30 as by means of a feeding device such as grooved feed rollers 32 and 34. It will be understood that the strips 18 and 20 are coated with a suitable adhesive, such as a polymer of polyvinylidene chloride or a paraffin wax and nitrocellulose mixture, so as to be self-sealing when heated, as well known in the art. Thus, as will appear more fully hereinafter, the tubular cellophane material is heat-sealed as it passes over the heated internal mandrel 26 and through the heated external heater 28; is thereafter cooled at 30 to set the adhesive and stiffen the material, and may then be cut into convenient lengths by the cutters 36 to fall upon a suitable conveyor 38.

The heated internal arbor 26 around which the plies 18 and 20 are formed into tubular shape, more particularly comprises an elongated electrical resistance heater which is removably secured to a suitable support 40 and extends through the guide 24 and through the external heater 28 and terminates at 42, slightly beyond the exit end of the heater 28, the extension 44 being provided for guiding the tubing a short distance after it leaves the heater 28. As shown, FIGS. 1 and 9, a fixture 45 includes parts 46 and 48 which are interconnected by screws 50 and 52 to clamp the arbor 26 therebetween, the fixture being provided with holes 54 and 56 for receiving pins 58 carried by the support 40. In this manner, the internal arbor 26 is maintained in the position shown in FIG. 1.

As shown more particularly in FIG. 3, the internal heated arbor 26 comprises a pair of concentrically arranged electrical resistance conductors, insulated from each other and provided with an insulating covering. More particularly, the central conductor 60 is provided with an insulating covering 62 of Teflon while the tubular conductor 64 is likewise provided with an insulating covering 65 of Teflon. The respective conductors 60 and 64 are connected together at the right hand end of the arbor 26, as viewed in FIG. 1 while the left hand ends are provided with terminals 66 and 68 for connection with a suitable electrical source. In this manner, a continuous electrical circuit is provided which, because the conductors are of resistance heating material, causes an even distribution of heat radially outwardly and throughout the length of the arbor 26. As shown in FIG. 3 the cellophane tubing material is illustrated at 70 in engagement with the Teflon coating, this being the arrangement of the arbor 26 and the tubing 70 at the exit end of the guide 24. The superposed plies 18 and 20 of cellophane form a web 72 at the entrance of the guide 24, see FIG. 4 and the internal heated arbor is placed on top of such web to extend through the guide 24 and heater 28 to the point 42.

The guide 24, see FIGS. 4 and 6–8, is preferably formed of sheet metal and is tapered from the entrance to the exit ends as shown in FIG. 4. Opposite edges 74 and 76 are bent inwardly from the base 78, see FIG. 6, to initially guide the traveling web 72, and the edges 74 and 76 from the entrance to the exit of the guide are gradually bent in an overlapping and tapering relationship which is such that one edge of the web 72 is confined by the edge 74 while the other edge of the web is guided by the edge 76 to roll over in tubular form and around the internal arbor. This action is insured by the formation of the edges 74 and 76 as shown in FIGS. 7 and 8 so that when the tubing material passes from the exit end of the guide 24, the web 72 has been wound upon itself and upon the arbor 26 to form a closed tube closely embracing the arbor. It is pointed out here that the heat imparted to the web 72 by the internal heated arbor 26 as the web 72 passes through the guide 24 is insufficient to activate the adhesive with which the cellophane plies are coated. Hence the tubing is readily formed by the guide due to the inherent slippery nature of the cellophane material. Preferably, a piece of sheet metal is rolled to provide a conical tip 79 which is fixed to the exit end of the guide 24, see FIG. 10, to insure proper sizing of the diameter of the tubular material 70 prior to its entry into the external heater 28.

The external heater 28 is more fully illustrated in the sectional view of FIG. 2 and includes an aluminum tube 80 having an electrical resistance conductor 82 uniformly wound therearound from one end to the other, the tube 80 being preferably provided with an internal covering of Teflon 84, the bore of which slidably engages the exterior surface of the tubing material 70 in heat exchange relation therewith, as the tubing material is drawn through the heater 28. A coating 86 of asbestos or other suitable heat insulating material surrounds the conductor 82 and preferably a coating 88 of similar heat insulating material is interposed between the conductor 82 and the tube 80 to effectively control the transfer of heat from the heating conductor 82 to the tube and from the latter through the Teflon coating 84 to the exterior of the tubular cellophane material 70. Terminals 89 and 91 are respectively connected with opposite ends of the resistance conductor 82 for connection with a suitable electrical source.

Preferably, the tubing 80 may extend outwardly a short distance from the external heater 28 toward the guide 24, see FIG. 1, and the entrance end of the tubing may be enlarged to receive the exit end of the tip 78 to center the latter when the apparatus is in use. The guide 24 is provided with oppositely extending arms 88 and 90 respectively provided with openings 92 and 94 for receiving pins 96 mounted upon a support 98. Preferably the openings 92 and 94 are somewhat larger than the mounting pins 96 to allow some slight lateral adjustment of the guide 24 to permit proper alignment thereof during the initial operation of the apparatus.

It will be noted from the above that the moving cellophane tubing material 70 slides along the Teflon coating 65 of the internal heating arbor 26 and also slides along the Teflon coating 84 provided in the internal bore of the external heater 28. As is well known in the art, Teflon is a polytetrafluoroethylene compound which is heat resistant to approximately 400° F. and is chemically inert to adhesive materials. The material is consequently of an anti-stick nature and allows the travel of the cellophane material throughout the heated areas in a smooth and efficient manner, notwithstanding the fact that the heating arbor 26 and the external heater 28 are so arranged as to heat the cellophane material to approximately 290° F. in order to activate the adhesive coatings thereon.

In practice, it has been found that with twelve (12) plies of the cellophane material heated as above set forth, a speed of travel of the material of approximately 40 feet per minute produces a highly satisfactory and rigid product wherein all of the plies of the material are securely adhered to each other and together. In such case, the radial outward flow of heat from the internal arbor 26 to the cellophane material and the radial inward flow of heat thereto from the external heater 28, as the material is drawn through the latter, is extremely effective in heat sealing all of the cellophane plies together. The length of the external heater 28 is so chosen that with the above speed of travel, the temperature of the tubing material 70 as it leaves the heater 28 will not be sufficiently high as to burn or scorch the material.

It is believed that the operation of the apparatus and the performance of the novel method of the invention will be readily understood from the foregoing description. More particularly, after a selected time interval following energization of the heaters 26 and 28, the cellophane web 72 is threaded around the arbor 26, through the external heater and in a straight line to the rotating feed device whereupon the latter is effective to continuously draw the material, as heretofore described, and project the same to the cutters 36. Due to the use of the stationary reel 22, the cellophane plies are drawn through the apparatus under slight tension, this action insuring close engagement of all of the plies with each other throughout the areas thereof in order to prevent the formation of any air or gas pockets which would otherwise prevent the proper heat sealing of the plies together.

While a preferred embodiment of the invention has been shown and described herein with considerable particularity, it will be readily understood that various modifications may be resorted to without departing from the spirit of the invention. For example, the invention is not limited to the use of regenerated cellulosic plastic material but may be employed with various types of cellulosic materials as well as sheet plastic materials wherein a strip or strips of such materials are capable of being adhered together under the application of heat. Other modifications may occur to those skilled in the art, all within the purview of the appended claims.

What is claimed is:

1. A continuous method of making a tubular and substantially rigid article of manufacture from a plurality of superposed strips of heat sealable material, which comprises continuously drawing the strips under tension along a path of travel, overlapping the edges of the moving strips to form a tube, drawing said tube along and in contact with an internally positioned elongated, heated arbor, and along and in contact with an exteriorly positioned heater element to simultaneously heat the exterior of said moving tube while the latter is being heated internally by said arbor to adhere said edges and the strips together, and continuously cooling the resultant material to set and stiffen the material.

2. The method as set forth in claim 1 wherein the superposed strips comprise adhesively coated cellulosic material.

3. The method as set forth in claim 1 wherein the surfaces of the heated arbor and the heater element which respectively contact the interior and exterior surfaces of the tube are coated with a polytetrafluoroethylene compound.

4. An apparatus for making a tubular and substantially rigid article of manufacture from a plurality of superposed strips of heat sealable material, which comprises means for continuously drawing the superposed strips under tension along a path of travel, means for overlapping the edges of the moving strips to form a tube, heating means surrounding the tube and in contact with the exterior thereof, a stationary heated arbor projecting through said tube and in contact with the interior thereof for supporting the latter and heating the interior thereof as the exterior of the tube is heated by said heating means, whereby said edges and the strips are adhered together, and means for continuously cooling the resultant material to set and stiffen the material.

5. An apparatus as set forth in claim 4 wherein the superposed strips consist of adhesively coated cellulosic material.

6. An apparatus as set forth in claim 4 wherein the surfaces of the heating means and the arbor which contact the exterior and interior surfaces of the tube are coated with a polytetrafluoroethylene compound.

References Cited

UNITED STATES PATENTS

| | | | |
|---|---|---|---|
| 1,284,064 | 11/1918 | De Lano | 138—156 |
| 1,933,279 | 10/1933 | Quarnstrom | 138—156 |
| 1,969,947 | 8/1934 | Rosener | 156—461 |
| 2,145,636 | 1/1939 | Scharf | 93—82 |
| 2,339,235 | 1/1944 | Allan | 156—461 |
| 2,918,104 | 12/1959 | Scott et al. | 156—180 |
| 2,933,988 | 4/1960 | Stark et al. | 93—82 |
| 2,948,649 | 8/1960 | Pancherz | 156—180 |
| 3,060,814 | 10/1962 | Wagner et al. | 93—82 |
| 3,066,721 | 12/1962 | Levy | 156—203 |

EARL M. BERGERT, *Primary Examiner.*

W. J. VAN BALEN, *Assistant Examiner.*